Aug. 21, 1934.   W. J. COULTAS   1,970,797
CORN HARVESTER
Filed Nov. 14, 1932
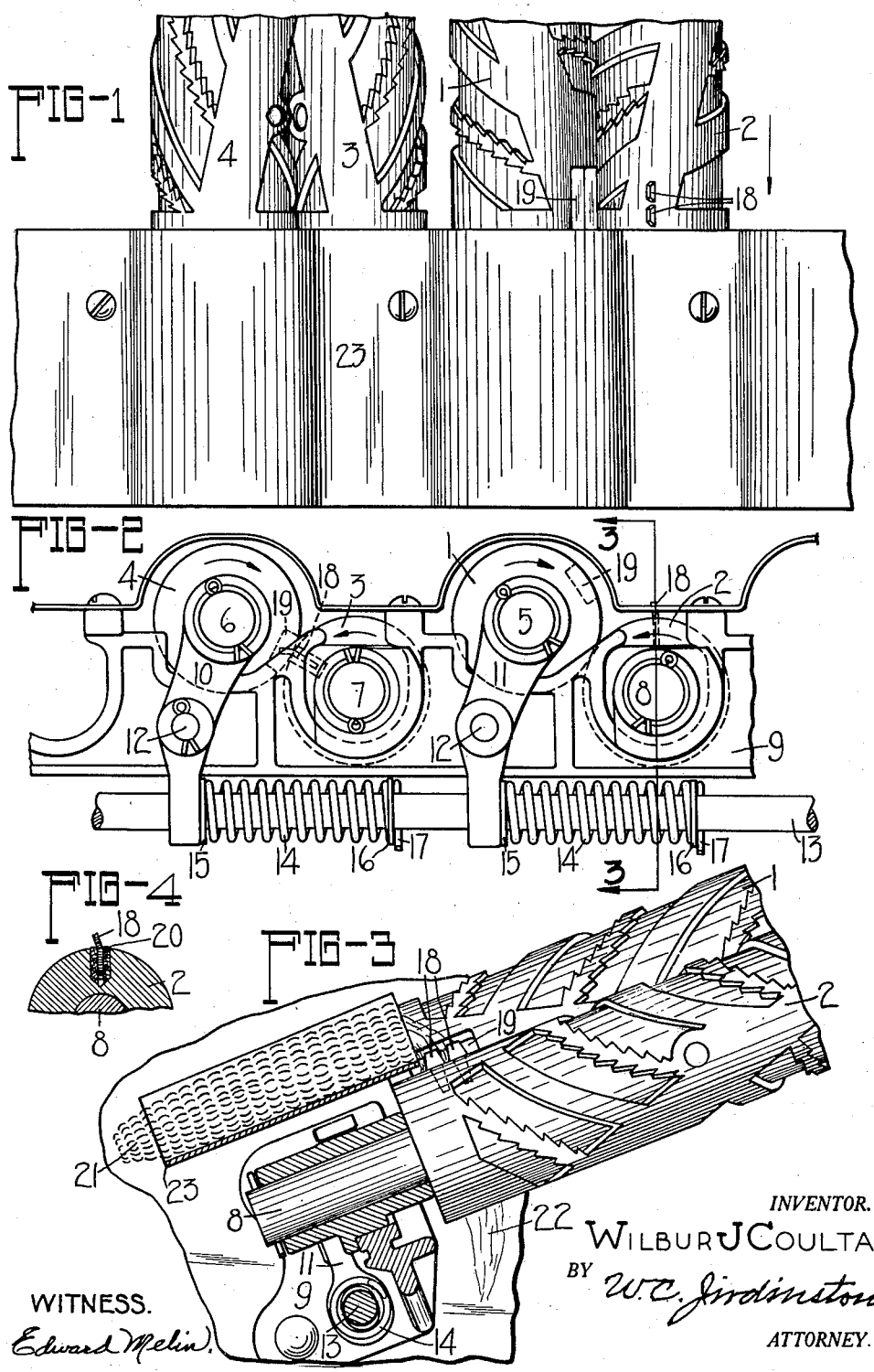
INVENTOR.
WILBUR J COULTAS
BY W.C. Jirdinston
ATTORNEY.
WITNESS.
Edward Melin Patented Aug. 21, 1934

1,970,797

UNITED STATES PATENT OFFICE 1,970,797

CORN HARVESTER

Wilbur J. Coultas, Moline, Ill., assignor to Deere & Company, Moline, Ill., a corporation of Illinois Application November 14, 1932, Serial No. 642,477

3 Claims. (Cl. 130—5)

My invention relates to corn harvesters and more particularly to that part of the mechanism operating to strip the husk from the ears.

It is a matter of common knowledge that the bracts forming a corn husk decrease in thickness and flexibility toward the ear they enclose. The inner bracts, or those closer to the ear, are so thin and flexible that in the husking operation they will be liable to slip through the rolls and be carried with the ear to storage or elsewhere. It is the object of my invention to add to the husking rolls, adjacent the point where the ear leaves the rolls, an improvement which will effectively remove any of the bracts which may have escaped the gripping action of the rolls in the progress of the ear from its engagement with the rolls to final separation therefrom.

Referring to the drawing in which similar numerals indicate identical parts—

Figure 1 is a plan view of sufficient of the structure of a corn husker deemed necessary to illustrate my invention;

Figure 2 is a front elevation of Figure 1;

Figure 3 is a side view of Figure 1 in part section; and,

Figure 4 is a detail section of my invention.

In the type of corn harvester, of which my drawing shows a part, the ears are first gathered by the picker rolls and are then mechanically passed to the husking rolls where the husks are removed. The picker rolls and the driving power mechanism are not shown, but it is presumed that an ear of corn has passed from the picker rolls to the husking rolls and is about to leave the latter, as shown in Figure 3. The bract, shown in dotted lines, is about to be caught by my improvement and torn from the ear to which it is attached.

In this instance a double set of husking rolls is shown, 1, 2, 3 and 4; the rolls are secured on shafts 5, 6, 7 and 8. The shafts 7 and 8 are journaled in rigid bearings on the frame 9, and the shafts 5 and 6 are journaled in bearings on rocker arms 10 and 11, respectively, which are pivotally mounted intermediate their length on spindles 12 on the frame 9. A rod 13 extends through holes in the lower ends of the rocker arms 10 and 11; on the rod are coiled springs 14 positioned between washers 15 on the lower end of the rocker arms and washers 16 on the rod, the washers 16 being held in place by cotters 17 passed through suitable holes in the rod. The rocker arms 9 and the coiled springs 14 cooperating to hold the rolls 1 and 4 yieldingly against the rolls 2 and 3.

The rolls are provided on their surface with gripping devices commonly employed to strip the husks from the ear as it progresses along the rolls. I supplement these devices by my improvement which consists of fingers 18. The fingers are arranged side by side longitudinally of the rolls and close to the edge of a plate 23 which extends rearwardly over the ends of the rolls and spaced therefrom; the fingers are held securely in place, in holes in the rolls by wooden wedges 20, as more clearly shown in Figure 4, and have a slight bend in the direction of rotation of the rolls on which they are utilized. On the rolls 1 and 4 are sockets 19 which, as the rolls rotate as indicated by the arrows, are entered by the fingers 18 as shown in dotted lines in Figure 2.

In the operation of my improvement, and as shown in the drawing, it is presumed that the ear of corn 21, illustrated in dotted lines in Figure 3, has traveled the length of the husking rolls and been divested of most of the husk; the very thin and flexible bracts 22 have escaped the stripping action of the rolls and unless removed from the ear, will pass on with the ear to the destination thereof. With my improvement, however, as the ear 21 reaches the ends of the rolls it slides up on the plate 23 which covers the lower ends of the rolls and their bearings, and as the ear progresses, any bracts which have not been removed by the stripping devices on the rolls, are caught by the fingers 18 and forced into the socket 19 so that the bracts are held securely and, as the rolls rotate, are stripped or sheared from the ear by their stress against the edges of the plate 23.

My invention has proven remarkably effective as an aid to clean operation of the stripping rolls in harvesting corn.

What I claim is:—

1. In a corn husker, the combination with the husking rolls having means thereon to strip the major husks from ears of corn, a plate covering the forward ends of the rolls and operating to receive ears of corn from the husking rolls, a socket in one of said rolls adjacent said plate, and fingers on the opposite roll adapted to enter said socket and grip inner bracts of a husk as an ear is received on the plate.

2. In a corn husker, the combination with the husking rolls having means thereon to strip the major husks from an ear of corn, a plate adjacent the forward ends of the rolls adapted to receive ears of corn from the husking rolls, a socket in one of said rolls adjacent the plate and rearward thereof, and fingers on the opposite roll bent to enter said socket and grip inner bracts of a husk as an ear is received on the plate.

3. In a corn husker, the combination with the husking rolls having means thereon to strip the major husks from an ear of corn, a plate covering the forward ends of the rolls to receive ears of corn therefrom, a socket in one of said rolls adjacent said plate, and fingers on the opposite roll adapted to enter said socket and grip inner bracts of a husk as the ear is received on the plate, and to hold said bracts against the edge of the plate whereby said bracts are sheared from the ear as the rolls rotate.

WILBUR J. COULTAS.